United States Patent [19]

Kleysteuber et al.

[11] 4,159,757
[45] Jul. 3, 1979

[54] BULK MATERIAL HANDLING SYSTEM

[75] Inventors: William K. Kleysteuber, Wexford; William D. Mayercheck, New Stanton, both of Pa.

[73] Assignee: The United States of America as represented by the United States Department of Energy, Washington, D.C.

[21] Appl. No.: 793,664

[22] Filed: May 4, 1977

[51] Int. Cl.² .................. B65G 65/02; B65G 41/02
[52] U.S. Cl. .................................. 198/303; 198/606
[58] Field of Search ............. 198/300, 303, 304, 305, 198/369, 587, 606, 835, 862, 865; 299/18, 43, 45, 64, 67; 104/95, 96, 102, 103, 183

[56] References Cited

U.S. PATENT DOCUMENTS

| | | | |
|---|---|---|---|
| 1,447,167 | 3/1923 | Bee et al. | 104/103 |
| 2,434,523 | 1/1948 | Sheets | 104/103 |
| 2,798,587 | 7/1957 | Bergmann | 198/303 |
| 2,922,625 | 1/1960 | Heacock | 104/183 |
| 2,992,725 | 7/1961 | Poundstone | 198/835 |
| 3,003,612 | 10/1961 | Poundstone | 198/303 |
| 3,017,012 | 1/1962 | Wilde | 198/835 |
| 3,268,058 | 8/1966 | Buckeridge et al. | 198/303 |
| 3,279,584 | 10/1966 | Towles | 198/303 |
| 3,568,605 | 3/1971 | Pettit | 104/95 |
| 3,920,115 | 11/1975 | Craggs | 198/831 |

FOREIGN PATENT DOCUMENTS

| | | | |
|---|---|---|---|
| 1393600 | 2/1965 | France | 104/103 |
| 990043 | 4/1965 | United Kingdom | 104/103 |

Primary Examiner—John J. Love
Assistant Examiner—Jeffrey V. Nase
Attorney, Agent, or Firm—Dean E. Carlson; Paul Devinsky

[57] ABSTRACT

This disclosure relates to a bulk material handling system particularly adapted for underground mining and includes a monorail supported overhead and carrying a plurality of conveyors each having input and output end portions with the output end portion of a first of the conveyors positioned above an input end portion of a second of the conveyors, a device for imparting motion to the conveyors to move the material from the input end portions toward the output end portions thereof, a device for supporting at least one of the input and output end portions of the first and second conveyors from the monorail, and the supporting device including a plurality of trolleys rollingly supported by the monorail whereby the conveyors can be readily moved therealong.

15 Claims, 27 Drawing Figures

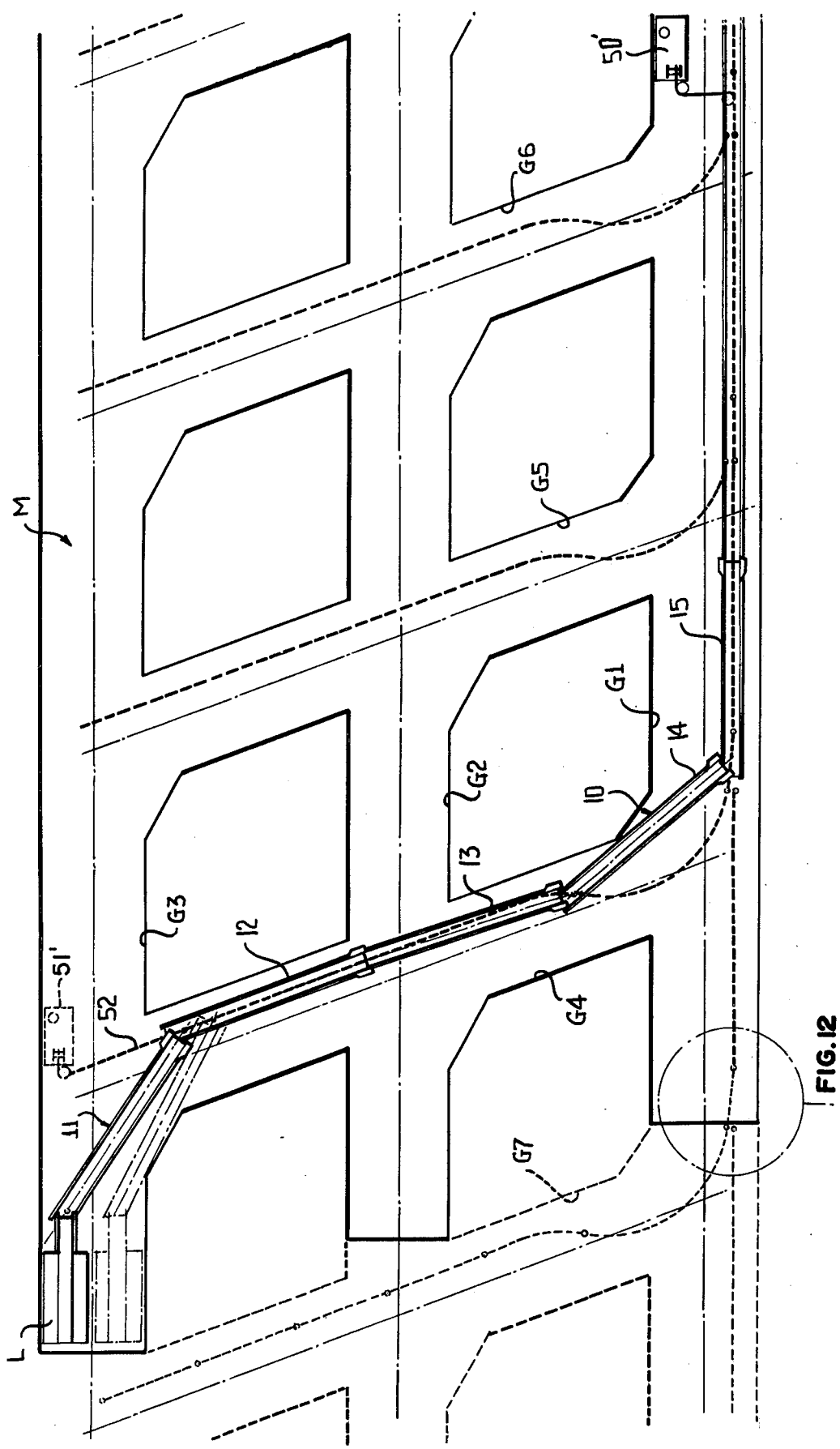

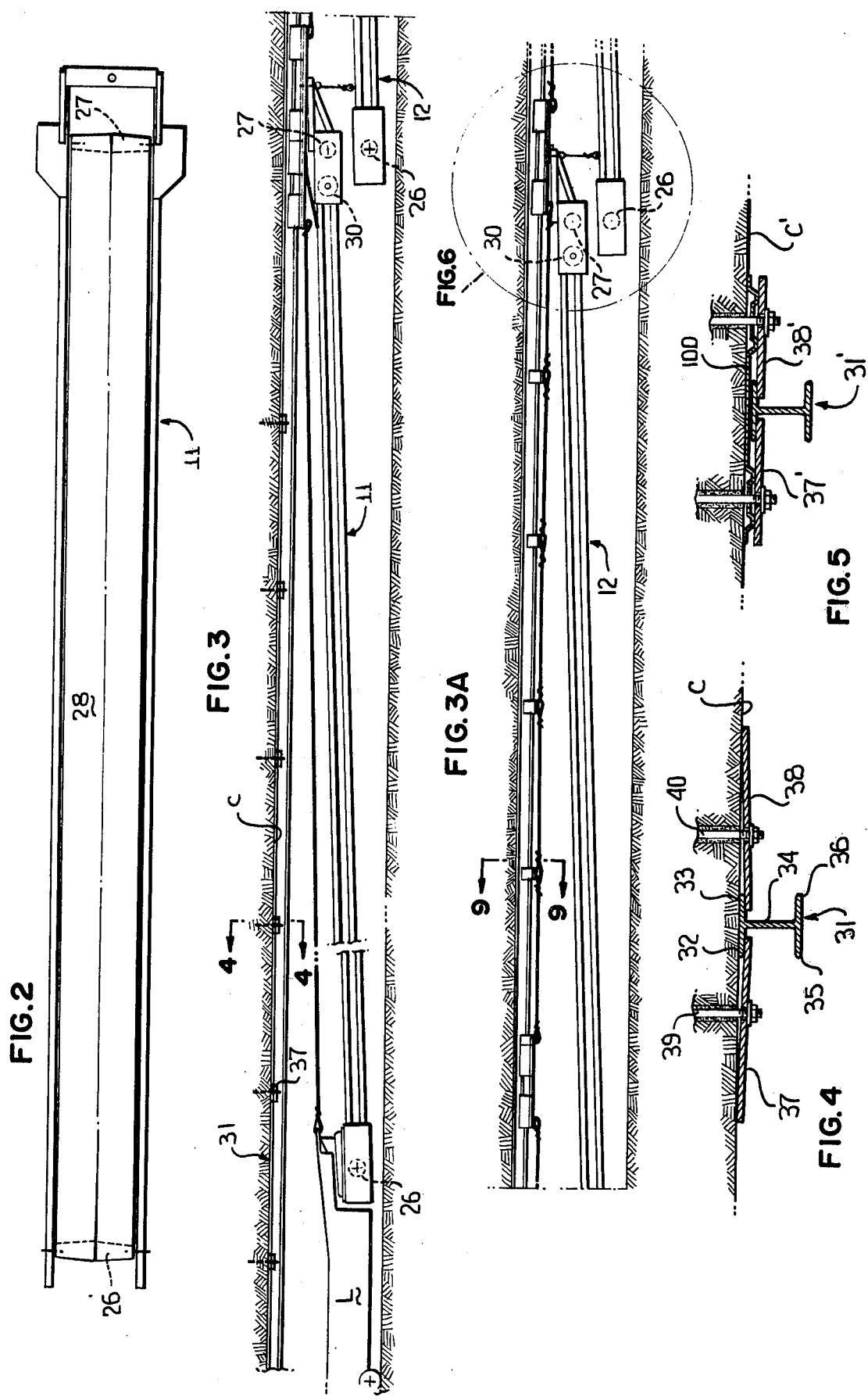

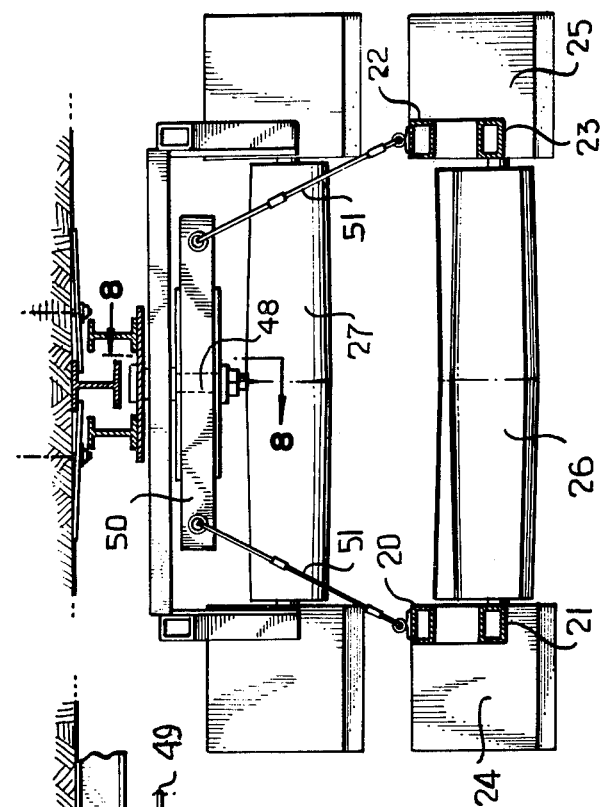
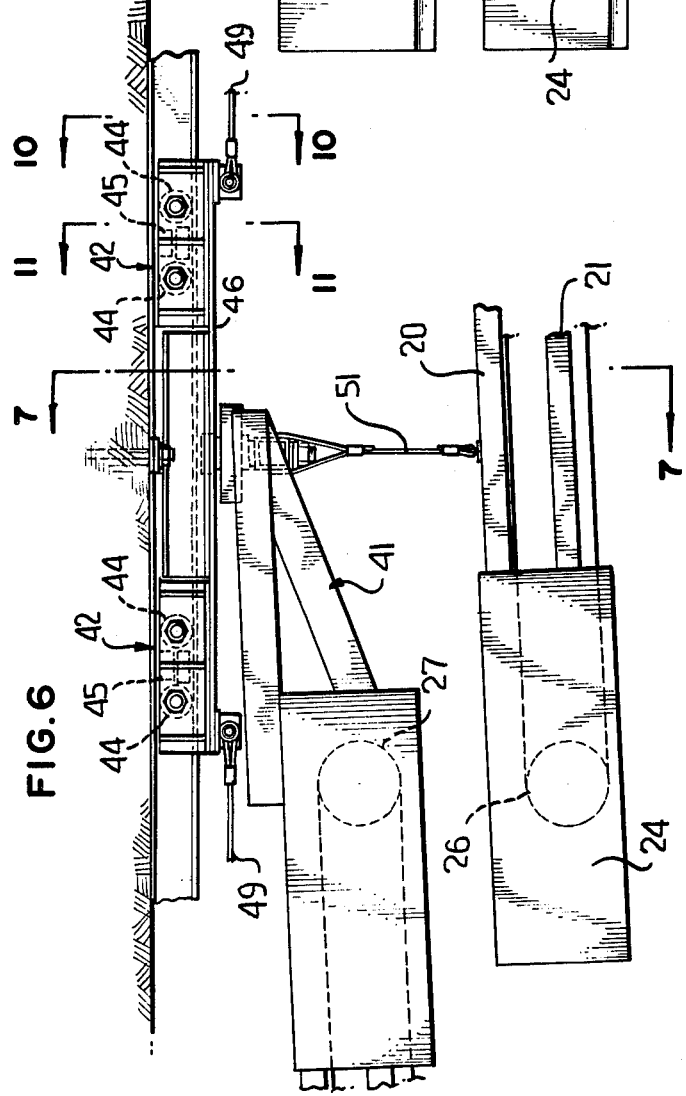
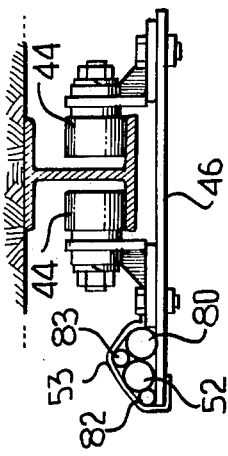
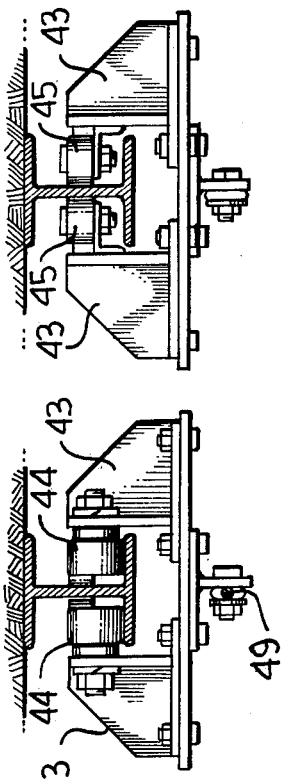
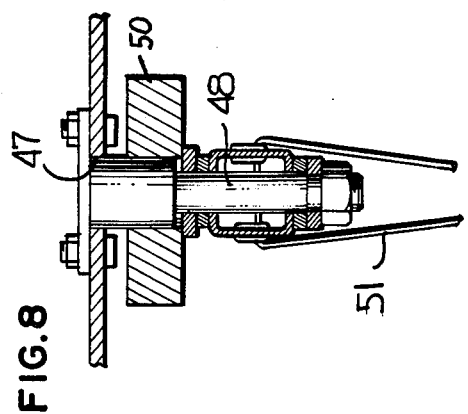

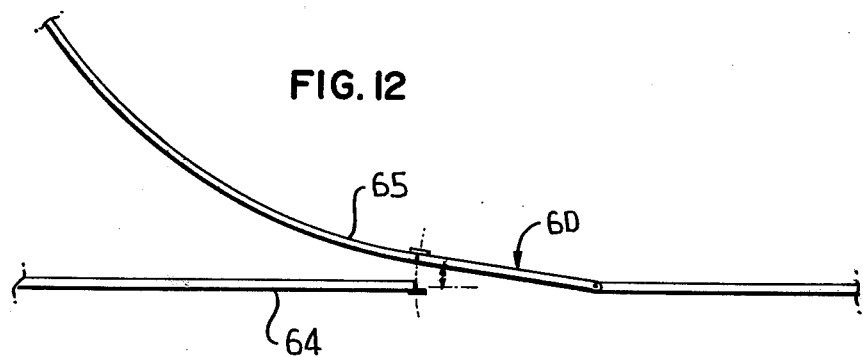
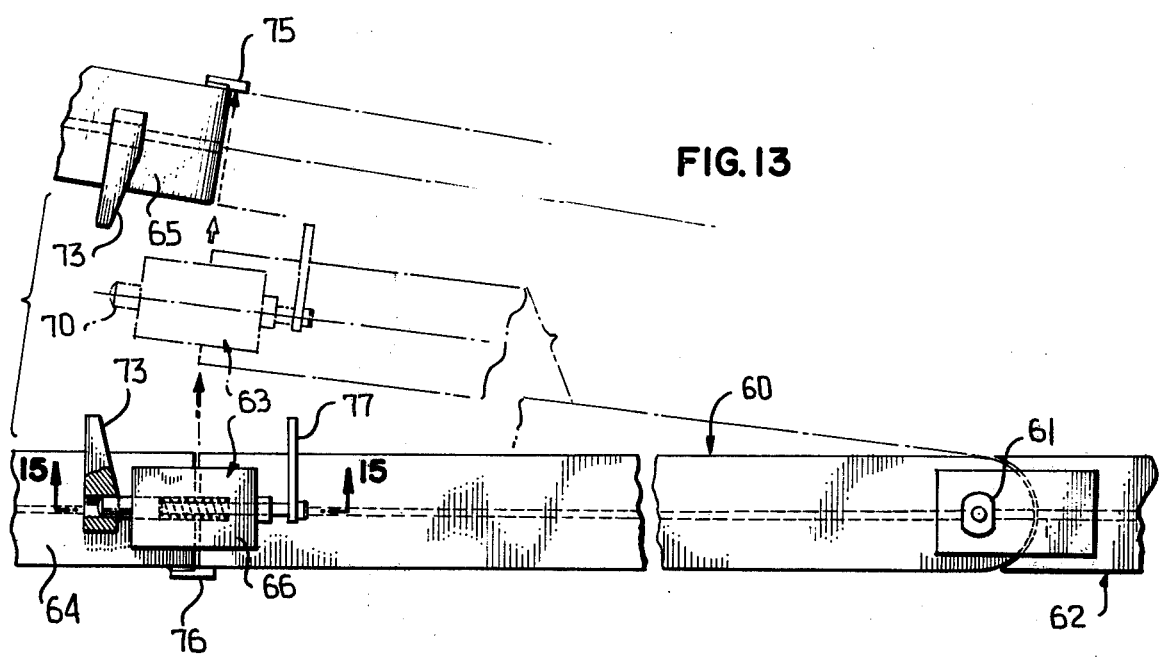
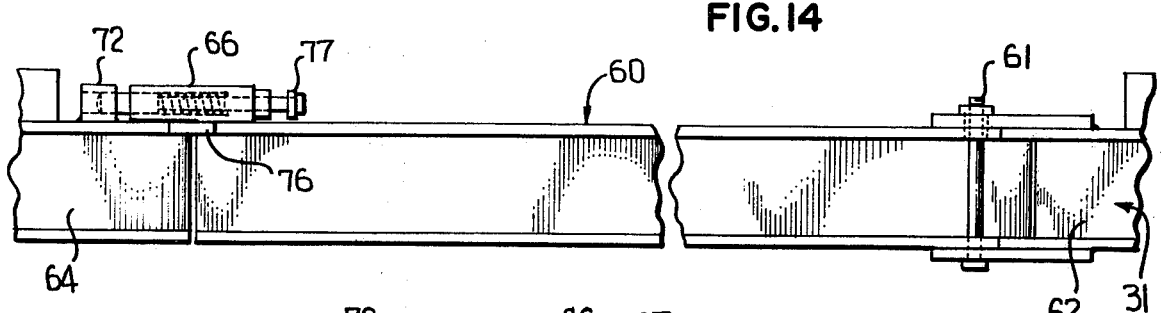
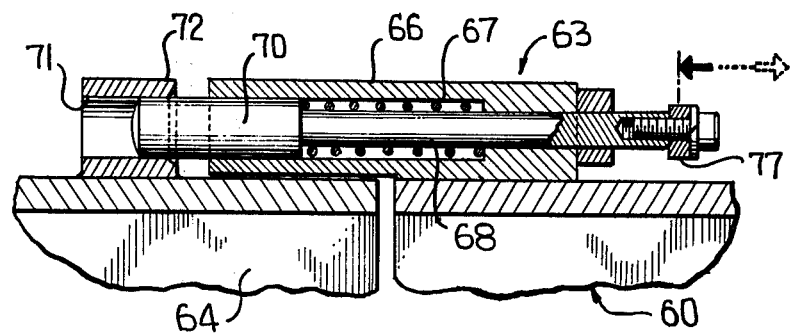

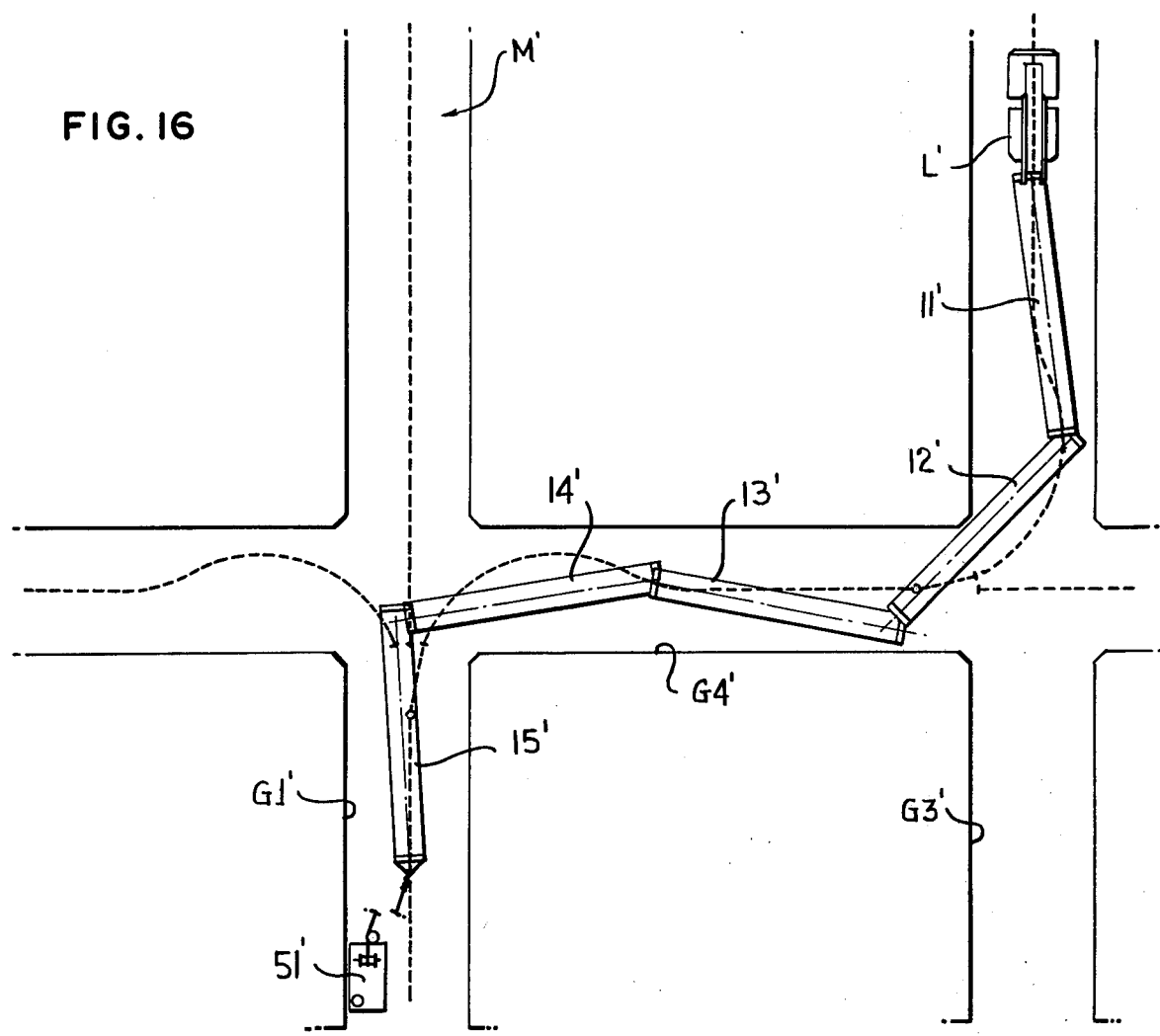
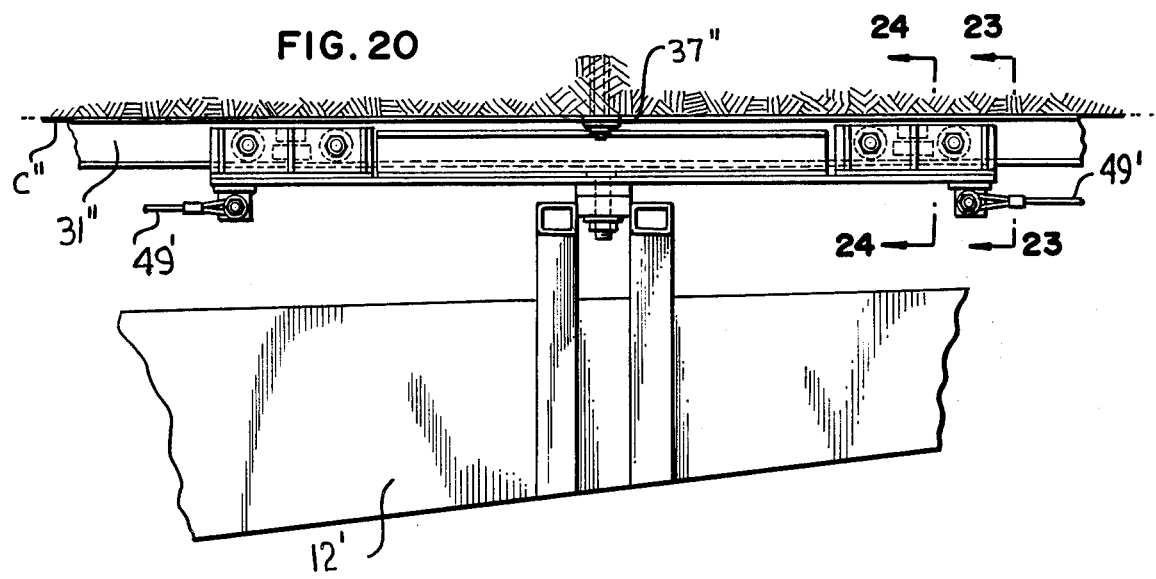

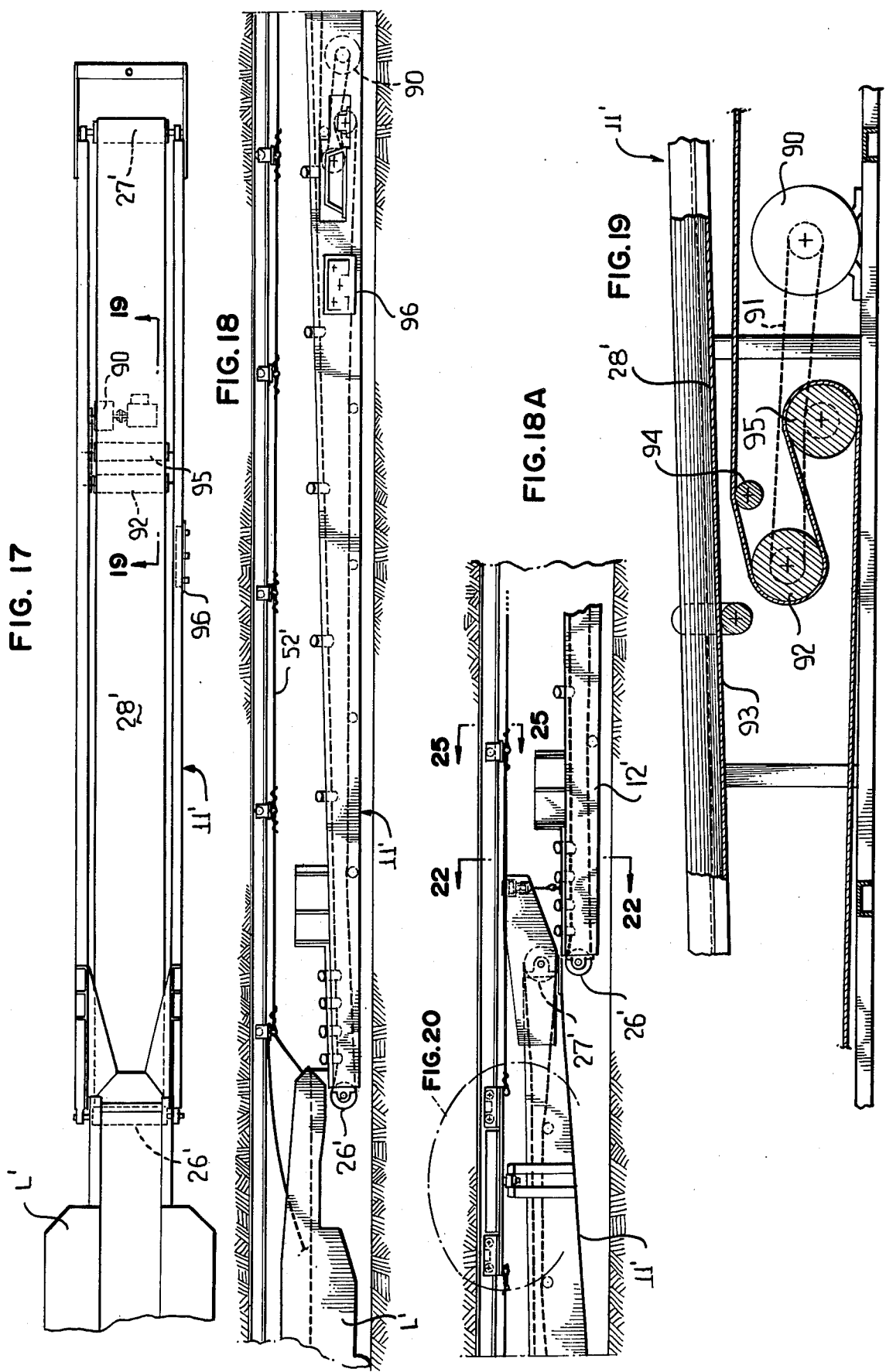

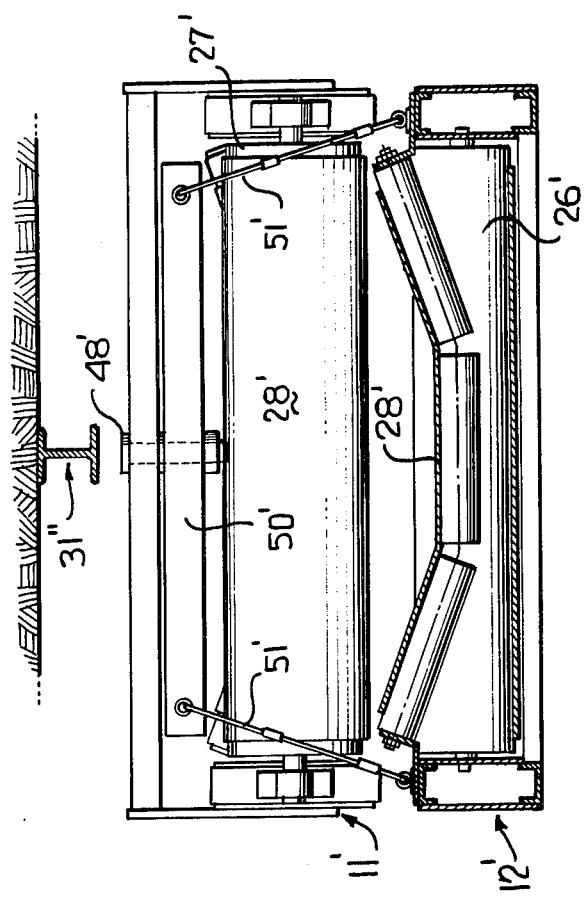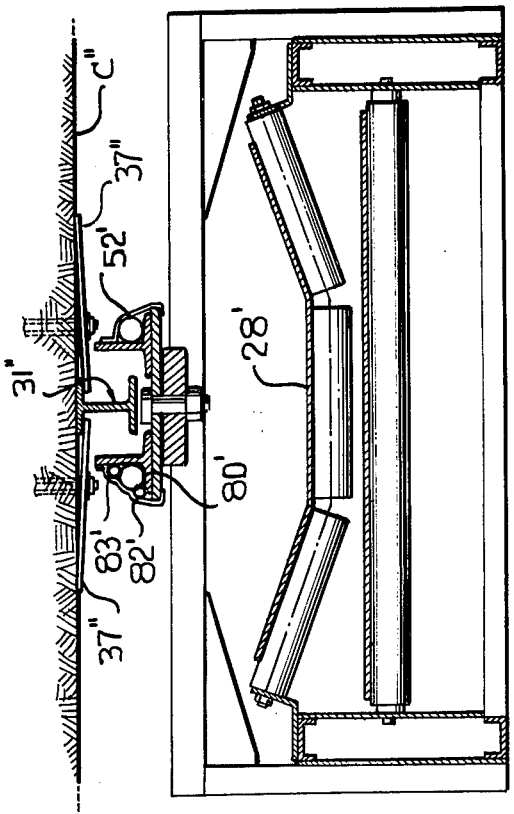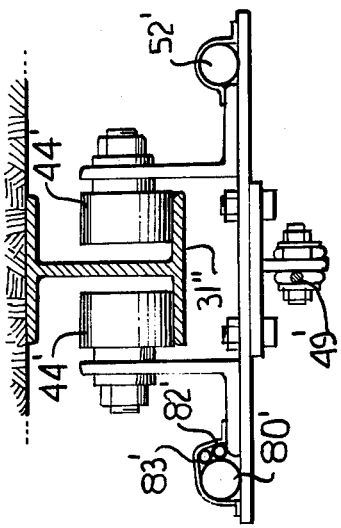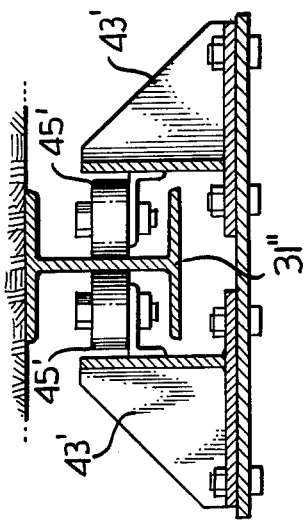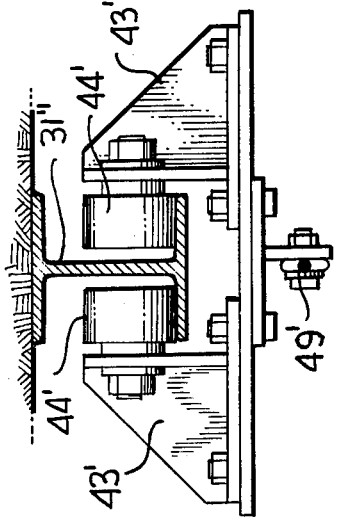

BULK MATERIAL HANDLING SYSTEM

The present invention is directed to a novel bulk material handling system specifically designed for coal mining operations, but not limited thereto. The present system has been designed to eliminate deficiencies of known prior art systems by specifically providing a novel conveyor utilizing a monorail for input to and output from a mining environment as, for example, a typical mine chamber of an anthracite or bituminous coal operation. At least two or more conveyors are provided in suspended cascading arrangement relative to the monorail and the conveyors further include trolleys which are rollingly supported by the monorail such that through associated cable means the conveyors can be drawn into or withdrawn from a typical mining environment. By virtue of this system, coal or like bulk material can be readily removed from a typical mining environment, and can be done so with relative ease and appreciably less cost than heretofore known.

A further object of this invention, is to provide in conjunction with the overall system of this invention, a novel conveyor which includes generally centrally thereof, a drive system independent of other conveyors such that the drive of each conveyor is independent of remaining conveyors, yet all conveyors are electrically coupled to each other such that the conveyance of bulk material from one conveyor to the other is achieved at a uniform pace dictated by the particular speed desired and selected by an operator.

A further object of this invention is that of providing a novel supporting system for adjoining conveyors such that the material departing from one of the conveyors cascades at a predetermined point relative to the next succeeding conveyor irrespective of the in-line or out-line of the conveyors relative to each other whereby spillage is virtually eliminated and maximum throughput of the material being conveyed is achieved.

Yet another object of this invention is to provide a novel bulk haulage system of the type heretofore described wherein the monorail is provided with a switching section that can be rapidly and effeciently moved from one position to another to position the conveyors in a particular chamber of a mine or the like.

A further object of this invention is to provide a novel bulk haulage system of the type heretofore described wherein the cable means heretofore described is connected through the trolleys to the separate conveyors and by suitable winch means the conveyor means can be drawn into or out of a typical mining environment in a relatively simple and efficient manner.

Still another object of this invention is to provide a novel bulk material conveyor system in which the various conveyors thereof can be readily disunited or reunited to the overall system in a very expeditious and efficient manner.

With the above and other objects in view that will hereinafter appear, the nature of the invention will be more clearly understood by reference to the following detailed description, the appended claimed subject matter, and the several views illustrated in the accompanying drawings.

IN THE DRAWINGS

FIG. 1 is a top plan view of a mine chamber, and illustrates a plurality of mine tunnels in one of which is located the bulk material handling system of this invention.

FIG. 2 is a top plan view of a conveyor of the bulk material handling system of this invention, and illustrates input and output end portions thereof.

FIG. 3 is a fragmentary side elevational view of a forward end portion of the bulk material handling system of this invention, and illustrates one of the conveyors thereof suspended at one end from a monorail and having suspended therefrom an input end portion of a second conveyor.

FIG. 3A is a continuation of FIG. 3 and illustrates the second conveyor and its relationship to a third conveyor of the bulk material handling system.

FIG. 4 is a fragmentary enlarged sectional view taken generally along line 4—4 of FIG. 3, and illustrates the manner in which the monorail is secured to the mine ceiling.

FIG. 5 is a fragmentary sectional view similar to FIG. 4, and illustrates another embodiment of the invention pertaining to the manner in which the monorail is secured to the mine ceiling.

FIG. 6 is an enlarged fragmentary side elevational view of the encircled portion of FIG. 3A, and illustrates with more specificity the particular suspension of the second and third conveyors relative to the monorail.

FIG. 7 is a sectional view taken generally along line 7—7 of FIG. 6, and illustrates the details of the suspension of the conveyors from the monorail.

FIG. 8 is an enlarged fragmentary sectional view taken generally along line 8—8 of FIG. 7, and illustrates with more particularity details of the conveyor suspension system.

FIG. 9 is an enlarged sectional view taken generally along line 9—9 of FIG. 3A, and illustrates one of a plurality of trolleys which support a plurality of conduits and cables including a cable for hauling in and hauling out the overall bulk material handling system from a mine chamber, galley, tunnel or the like.

FIG. 10 is an enlarged sectional view taken generally along line 10—10 of FIG. 6, and illustrates details of another trolley associated with the conveyors of the bulk material handling system.

FIG. 11 is a sectional view taken generally along line 11—11 of FIG. 6, and illustrates another trolley providing guidance for the overall conveying system.

FIG. 12 is a schematic view of the encircled portion of FIG. 1, and illustrates a switch section between a pair of monorail sections of the bulk material handling system.

FIG. 13 is an enlarged fragmentary top plan view of the switch section of FIG. 12, and illustrates in solid lines the in-line position of the switch-section relative to two other portions of the monorail, an intermediate position of the switch-section, and a third position at which the conveyors can be drawn about an arc into any desired tunnel or gallery.

FIG. 14 is a fragmentary side elevational view of the monorail switch-section of FIG. 13, and illustrates a locking mechanism for retaining the monorail switch-section in lock relationship relative to another section of the monorail.

FIG. 15 is an enlarged fragmentary sectional view taken generally along line 15—15 of FIG. 13, and illustrates details of the locking mechanism maintaining the monorail switch-section in interlock relationship with an adjoining monorail section.

FIG. 16 is a top plan view similar to FIG. 1 and illustrates another bulk material handling system of this invention.

FIG. 17 is a top plan view of a conveyor associated with the bulk material handling system of FIG. 16.

FIGS. 18 and 18A are side elevational views of conveyors associated with the bulk material handling system of FIG. 16, and FIG. 18 particularly illustrates a centrally located drive mechanism for the conveyor belt of the illustrated conveyor.

FIG. 19 is an enlarged fragmentary sectional view taken generally along line 19—19 of FIG. 17, and illustrates details of the drive mechanism for the conveyor of FIGS. 17, 18 and 18A.

FIG. 20 which appears on the sheet of drawing containing FIG. 16, is a fragmentary side elevational view of the encircled portion of FIG. 18A.

FIG. 21 is an enlarged sectional view taken generally along line 21—21 of FIG. 18, and illustrates details of the conveyor and suspension system of the invention.

FIG. 22 is an enlarged sectional view taken generally along line 22—22 of FIG. 18A, and illustrates further details of the suspension system of the present invention.

FIG. 23 is an enlarged sectional view taken through the monorail of FIG. 18, and illustrates one of a plurality of trolleys from which are suspended the conveyors of the present embodiment of the invention.

FIG. 24 is a sectional view similar to FIG. 23, and illustrates another trolley having rollers disposed with the axes thereof vertical for edge guidance of the overall conveyor system.

FIG. 25 is a view similar to FIG. 23 taken generally along line 25—25 of FIG. 18A, and illustrates another supporting trolley of the present invention.

A novel bulk material handling system constructed in accordance with the present invention is illustrated in FIG. 1 and is generally referred to by the reference numeral 10. The bulk material handling system 10 is designed specifically for removing coal from an underground mine M which may include a plurality of tunnels or galleys G1 through G3 traversed by galleys or tunnels G4 through G6. The system 10 includes a plurality of conveyors 11 through 15, the first of which is suspended from a mine loader L.

Inasmuch as the conveyors 11 through 15 are of identical construction, the following description of the conveyors 11 and 12 is applicable to the remaining conveyors 13 through 15 and other conveyors which may be similarly made part of the overall handling system 10.

The conveyors 11 and 12 each include generally parallel side rails 20, 21 and 22,23 (FIG. 7). The side rails 20 through 23 are suitably secured to each other by end blocks 24, 25 within which are journalled rollers 26, 27. Entrained about the rollers 26, 27, is a conveyor belt 28 which is driven through a conventional electric drive motor 30. Preferably, an individual drive motor 30 is provided for each of the conveyors 11 through 15.

The conveyors 11 through 15 are supported at least at output end portions thereof (unnumbered) by a plurality of trolleys associated with a monorail 31. The monorail 31 (FIG. 4) is an I-beam having uppermost flanges 32, 33, an intermediate web 34, and lowermost flanges 35,36. The monorail 31 is supported from the ceiling C (FIG. 4) of any of the galleys or tunnels G1 through G6 by means of a plurality of plates 37, 38 secured by appropriate mine bolts 39, 40 in the manner readily apparent from FIG. 4.

Each of the conveyors 11 through 15 includes a cantilever portion 41 (FIG. 6) which is suspendingly supported by one or more trolleys 42. The trolleys 42 each include a pair of angle brackets 43 (FIGS. 9 through 11). The trolleys 42 carry support rollers 44 (FIGS. 9 and 10) and edge guidance rollers 45 (FIG. 11). The rollers 44 are supported by the flanges 35, 36 while the edge guidance rollers 45 bear against the web 34 of each of the monorails 31.

As is best illustrated in FIGS. 6 and 7, the trolleys 42 are suitably secured to each other by a supporting plate 46 and the latter at each of the cantilever portions 41 is provided with an aperture 47 (FIG. 8) through which descends a spindle 48 which passes through a crossbar 50 (FIG. 7), and the latter includes a pair of rods 51, 51 which are attached to the respective frames 20, 22 of the associated conveyors 11 through 15. By virtue of this construction, the conveyors 11, 12 are disposed in what might be best termed a cascading relationship such that bulk material, such as coal, deposited upon the conveyor belt 28 of the conveyor 11 will ascend from left-to-right as viewed in FIG. 3 and will become deposited upon the conveyor belt 28 of the conveyor 12 and this continuous motion of the bulk material will continue through each of the conveyors 11 through 15.

The spindle 48 is designed to permit relative rotation between the conveyors 11, 12; 12, 13; etc. in order that whether the conveyors are in line, as are the conveyors 12, 13 of FIG. 1, or at an angle to each other, as are the conveyors 11, 12, 13, 14, and 14, 15 of FIG. 1, the bulk material will be deposited from the output end portion of the uppermost conveyor 11, 12, etc. to a point which is generally at the connection of the suspension rods 51, 52' with the lowermost conveyor. In this manner, irrespective of the deposition of the conveyors angularly or inline relative to each other, the bulk material is deposited upon the lowermost conveyor at a precise and regulated point.

The overall system 10 is designed to be readily moved into and removed from any of the tunnels or galleys G1 through G6 (FIG. 1). To aid in this tensioning cables 49 are strung between adjacent trolley, and as is best illustrated in FIG. 1, a pair of winches 51', 50' are provided at positions which permit the conveyors 11 through 15 to be drawn into or withdrawn from the various tunnels G1-G6. Strung between the winches 50',50' is one or more winch cables 52 which are connected to selected ones of the trolleys 42 in the manner clearly illustrated in FIG. 9 by brackets 53. In this fashion, the cable 52 is connected to preferably all of the trolleys 42, and upon operation of the winches 51',50' the overall system can be respectively drawn into or withdrawn from the tunnels or galleys G1 through G6 of the mine M.

Reference is now made to FIG. 1 of the drawings which illustrates the bulk material handling system disposed generally in the tunnels or galleries G1, G3 and G4. Another tunnel or gallery which might be dug in the mine M is indicated by the reference numeral G7. In order to dig the tunnel G7, it is necessary for the system 10 to traverse the corner (unnumbered) indicated in dashed lines at generally the encircled portion dennoted by FIG. 12 in FIG. 1. This is achieved by providing the monorail with a switch-section which is generally designated by the reference numeral 60 (FIGS. 12 through 15). The monorail switch section 60 includes a vertical pivot 61 (FIGS. 13 and 14) which couples the monorail switch-section 60 to end portion 62 of the overall monorail 31.

At an opposite end portion from the pivot 61, the monorail switch-section 60 carries suitable locking means 63 for locking and unlocking the switch-section 60 relative to end portions 64 and 65 of the overall monorail 31. The locking mechanism 63 includes a housing 66 having a bore 67 in which is housed a spring 68 which urges a locking pin 70 to the left as viewed in FIGS. 14 and 15. The pin 70 in the locked position thereof engages within a bore 71 of a member 72 welded or otherwise fastened to the end portions 64 and 65 of the monorail 31. The member 72 of each of the portions 64, 65 includes a cam surface 73 such that upon pivoting movement of the monorail switch-section 60 from the position shown in solid outline in FIG. 13 toward and through the final position illustrated in FIG. 12, the pin 70 will be guided along the cam surface 73 and will essentially fall into place within the bore 71 of the end portion 65.

Appropriate abutment means 75, 76 are welded or otherwise secured to the sections 64, 65 of the monorail 31. Thus, as the switch-section 60 is pivoted from the solid outline position shown in FIG. 13 toward the phantom outline position thereof, the end portion (unnumbered) of the switch-section 60 will contact the abutment 75 and alignment between the portions 60, 65 will be assured. Likewise, identical pivoting motion in the opposite direction will assure that the monorail switch-section 60 will align with the end portion 64 upon pivotal motion of the switch-section 60 from the phantom line position of FIG. 13 toward the solid outline position.

A suitable handle 77 is associated with each of the pins 70 in order that though automatic interlocking is assured by the cam surfaces 73, such can be achieved manually by grasping the handles 77 and pulling the same to extract the pins 70 from the associated bores 71 or position the latter therein.

In addition to the cables 59 connected between the various trolleys 42, the brackets 53 (FIG. 9) additionally constrain a power cable 80 (FIG. 9) for the loader L (FIG. 1), a conveyor power cable 82 for powering the drive motors 30 of each of the conveyors 11 through 15, and a communication cable 83. Preferably, the cables 59, 80, 82 and 83 have quick-connect coupling means at each of the end portions of the conveyors 11 through 15 in order that should a conveyor become demobilized, it can be readily removed from the overall system and quickly replaced with another conveyor section.

Reference is now made to FIGS. 16 through 25 of the drawings which illustrate another bulk material handling system to which substantial identical parts as that of the system 10 have been identified with like reference numerals though primed. With reference to the bulk material handling system 10′, the conveyors 11′ through 15′ are generally similar to those of the system 10 except that each conveyor 11′ through 15′ includes generally medially thereof, a separate drive system which, as is best illustrated in FIG. 19, includes a drive motor 90, a drive chain 91, and a drive roller 92 about which is entrained the conveyor belt 93. The conveyor belt 93 is additionally entrained about an idler pulley or roll 94 and a relatively larger roll 95 (FIG. 19). In FIG. 19, pulleys 92 and 95 are both drive pulleys as the drive chain 91 wraps around the sprocket 92 and on leaving that sprocket the return engages the sprocket attached to pulley 95 thus turning it by power in the correct direction. A suitable control panel 96 (FIG. 18A) is provided at each of the conveyors 11′ through 15′ for controlling the speed and operation of the belt 93 associated therewith.

Reference is now made to FIG. 5 of the drawings which illustrates an embodiment of the suspension system for a monorail 31′. The monorail 31′ includes upper flanges (unnumbered), a web (unnumbered) therebetween, and lower flanges (also unnumbered). However, sandwiched between a ceiling C′ and plates 37′ and 38′ is a sheet of corrugated metal 100 provided with suitable apertures (unnumbered) through which pass conventional mine bolts (unnumbered). Depending upon the condition of the overburden or ceiling c′ the embodiment of the invention illustrated in FIG. 5 has been found at times preferable for mounting the monorail 31′ as opposed to that best illustrated in FIG. 4.

We claim:

1. A bulk material handling system comprising:
 a. a monorail and means for supporting said monorail from an overhead supporting surface;
 b. a plurality of substantially identical conveyors, each having input and output end portions, the output end portion of a first of said conveyors being positioned above the input end portion of a second of said conveyors;
 c. first drive means for moving each of said conveyors in a direction to move bulk material from the input end portions to the output end portions;
 d. support means for suspendingly supporting the input end portion of said second conveyor from said output end portion of the first conveyor, said support means including means for pivotally connecting the output end portion of said first conveyor and the input end portion of said second conveyor relative to each other, and trolley means rollingly supported by said monorail for permitting said plurality of conveyors to be moved along said monorail, said pivoted connecting means and said trolley means being connected and aligned to permit said first and second conveyors to be moved between in-line and out-of-line position about an axis generally normal to said monorail so that the center-to-center alignment is maintained between said first and second conveyors relative to the bulk material passing therebetween; and
 e. cable means for coupling said trolleys of said plurality of conveyors, and second drive means for pulling said cable means to move said plurality of conveyors along said monorail.

2. The bulk material handling system as defined in claim 1 wherein said monorail is defined by a plurality of separate monorail sections, first and second of said monorail sections being in spaced generally aligned relationship, a third of said monorail sections being in side-by-side angular relationship to said second monorail section, a monorail switch section, and means pivotally connecting said monorail switch section to said first monorail section whereby said monorail switch section can be selectively disposed in alignment between said first and second monorail sections and said first and third monorail sections.

3. The bulk material handling system as defined in claim 2, including a locking pin slideably carried by said monorail switch section removal from said pivotal connecting means, first and second aperture means carried by said second and third monorail sections respectively for receiving said locking pin, means biasing said locking pin in a direction away from said pivotal connecting means, and first and second wedge means associated with said first and second aperture means respectively for progressively urging said pin against the biasing force of said biasing means during the pivoting movement of said monorail switch section from said third monorail section toward said second monorail section and vice versa, respectively.

4. The bulk material handling system as defined in claim 2 including a cantilever support projecting beyond said first conveyor output end portion, and suspension means between said cantilever support and said second conveyor input end portion.

5. The bulk material handling system as defined in claim 2 including a cantilever support projecting beyond said first conveyor output end portion and over said second conveyor input end portion, and said supporting means including a pivotal connection between one of said trolleys and said cantilever support.

6. The bulk material handling system as defined in claim 1 including a cantilever support projecting beyond said first conveyor output end portion, and suspension means between said cantilever support and said second conveyor input end portion.

7. The bulk material handling system as defined in claim 6 wherein said monorail is defined by a plurality of separate monorail sections, first and second of said monorail sections being in spaced generally aligned relationship, a third of said monorail sections being in side-by-side angular relationship to said second monorail section, a monorail switch section, and means pivotally connecting said monorail switch section to said first monorail section whereby said monorail switch section can be selectively disposed in alignment between said first and second monorail sections and said first and third monorail sections.

8. The bulk material handling system as defined in claim 1 wherein second drive means including a first winch means remote from said conveyors for winding said cable to pull said trolleys and said conveyors along said monorail in a first direction and including a second winch means at an end of said conveyor opposite said first winch means for winding said cable to pull said trolleys and said conveyors along said monorail in a second direction generally opposite said first direction.

9. The bulk material handling system as defined in claim 1 wherein said monorail includes at least a pair of lateral flanges and a longitudinal web, selected ones of said trolleys include wheels resting upon said lateral flanges, and others of said trolley include wheels resting against opposite sides of said longitudinal web.

10. The bulk material handling system as defined in claim 9 wherein said monorail is defined by a plurality of separate monorail sections, first and second of said monorail sections being in spaced generally aligned relationship, a third of said monorail sections being in side-by-side angular relationship to said second monorail section, a monorail switch section, and means pivotally connecting said monorail switch section to said first monorail section whereby said monorail switch section can be selectively disposed in alignment between said first and second monorail sections and said first and third monorail sections.

11. The bulk material handling system as defined in claim 9 including a cantilever support projecting beyond said first conveyor output end portion, and suspension means between said cantilever support and said second conveyor input end portion.

12. The bulk material handling system as defined in claim 9 including a cantilever support projecting beyond said first conveyor output end portion and over said second conveyor input end portion, and said supporting means including a pivotal connection between one of said trolleys and said cantilever support.

13. The bulk material handling system as defined in claim 1 including a cantilever support projecting beyond said first conveyor output end portion and over said second conveyor input end portion, and said supporting means including said pivotal connection between one of said trolleys and said cantilever support.

14. The bulk material handling system as defined in claim 13 said supporting means further including said means for suspending said second conveyor input end portion from said first conveyor output end portion at a point inboard of a terminal end of said second conveyor input end portion.

15. The bulk material handling system as defined in claim 1 wherein said first drive means is a separate drive means associated with each of said plurality of conveyors, and said separate drive means are each disposed between the input and output end portions of its associated conveyor.

* * * * *